US012754155B2

(12) United States Patent
Li et al.

(10) Patent No.: US 12,754,155 B2
(45) Date of Patent: Oct. 6, 2026

(54) REACTOR AND METHOD COMMONLY APPLICABLE FOR HIGH-PRESSURE IN-SITU DSC AND NEUTRON TESTS OF GAS HYDRATE

(71) Applicant: GUANGZHOU INSTITUTE OF ENERGY CONVERSION, CHINESE ACADEMY OF SCIENCES, Guangzhou (CN)

(72) Inventors: Xiaosen Li, Guangzhou (CN); Yisong Yu, Guangzhou (CN); Xuke Ruan, Guangzhou (CN); Jianwu Liu, Guangzhou (CN); Wenzhe Sun, Guangzhou (CN); Zhaoyang Chen, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 302 days.

(21) Appl. No.: 18/664,339

(22) Filed: May 15, 2024

(65) Prior Publication Data

US 2025/0137953 A1 May 1, 2025

Related U.S. Application Data

(63) Continuation of application No. PCT/CN2023/131929, filed on Nov. 16, 2023.

(30) Foreign Application Priority Data

Oct. 31, 2023 (CN) ......................... 202311433170.4

(51) Int. Cl.

| | |
|---|---|
| ***G01N 25/48*** | (2006.01) |
| ***G01K 17/04*** | (2006.01) |
| ***G01T 3/04*** | (2006.01) |

(52) U.S. Cl.

CPC ......... *G01N 25/4866* (2013.01); *G01K 17/04* (2013.01); *G01N 25/4833* (2013.01); *G01T 3/04* (2013.01)

(58) Field of Classification Search

CPC ............... G01K 17/04; G01N 23/2073; G01N 25/4833; G01N 25/4866; G01T 3/04

See application file for complete search history.

(56) References Cited

U.S. PATENT DOCUMENTS

2019/0372449 A1* 12/2019 Mills ......................... C01B 3/00
2020/0366180 A1* 11/2020 Mills ......................... C01B 3/00
(Continued)

FOREIGN PATENT DOCUMENTS

CN 109758976 B 7/2021
CN 114718518 A * 7/2022 ............. E21B 43/01

OTHER PUBLICATIONS

Pullen et al., Design and implementation of a differential scanning calorimeter for the simultaneous measurement of small angle neutron scattering, Measurement Science and Technology 25 (2014) 055606 (8pp), IOP Publishing Ltd Printed (Year: 2014).*

*Primary Examiner* — David L Singer

(74) *Attorney, Agent, or Firm* — Bayramoglu Law Offices LLC

(57) ABSTRACT

A reactor and method commonly applicable for high-pressure in-situ DSC and neutron tests of a gas hydrate relates to the field of characterization of physical and chemical properties of the gas hydrate. The reactor can not only carry out a high-pressure and low-temperature in-situ DSC test of the hydrate but also be suitable for a neutron diffraction test of the hydrate. The reactor can be adapted to an existing high-pressure and low-temperature in-situ DSC device without the need to re-develop a whole set of system, thus greatly reducing the replacement cost of the device. Owing to the sectional design, the flexibility and the applicability of the (Continued)

reactor can be ensured. Researchers can conveniently transport the hydrate in a pressure-maintaining manner. Even at a long distance, with the assistance of a liquid nitrogen tank or a vehicle-mounted refrigerator, it can be ensured that the hydrate may not be decomposed during transportation.

18 Claims, 2 Drawing Sheets

(56) References Cited

U.S. PATENT DOCUMENTS

2021/0072216 A1* 3/2021 Song ........................ G01N 1/42
2025/0055363 A1* 2/2025 Mills ...................... H02K 44/08

* cited by examiner

REACTOR AND METHOD COMMONLY APPLICABLE FOR HIGH-PRESSURE IN-SITU DSC AND NEUTRON TESTS OF GAS HYDRATE

CROSS REFERENCE TO THE RELATED APPLICATIONS

This application is the continuation application of International Application No. PCT/CN2023/131929, filed on Nov. 16, 2023, which is based upon and claims priority to Chinese Patent Application No. 202311433170.4, filed on Oct. 13, 2023, the entire contents of which are incorporated herein by reference.

TECHNICAL FIELD

The present invention relates to the field of characterization of physical and chemical properties of a gas hydrate, in particular to a reactor and method commonly applicable for high-pressure in-situ differential scanning calorimetry (DSC) and neutron tests of a gas hydrate.

BACKGROUND

A gas hydrate is a clathrate complex formed by gas and water at a low temperature and a high pressure, in which water molecules form a clathrate structure of the hydrate by hydrogen bonds, and gas molecules are stably stored in clathrate space under the action of a van der Waals force. At present, the study on the gas hydrate mainly focuses on three aspects. First, exploitation of a natural gas hydrate (combustible ice): the natural gas hydrate is prevalent on the Earth and is considered as one of the important alternative energy sources in the 21$^{st}$ century; and in recent decades, researchers have been committed to finding an economical, safe and efficient method for exploiting combustible ice. Second, comprehensive utilization technology of the hydrate: based on excellent physical and chemical properties of the hydrate, researchers have developed the hydrate-based carbon capture and separation technology, the hydrate-based natural gas solidification and transportation technology, the hydrate-based seawater desalination technology, etc. Third, synthesis and characterization of special hydrates: these hydrates include an air hydrate present at the North and South Poles of the Earth, a helium hydrate and an argon hydrate on other stars in the universe, etc.; and the studies on these hydrates will help us to understand the course of evolution of the North and South Poles on the Earth and other stars in the universe. It is worth noting that regardless of which of the above areas is studied, it is indispensable to test and characterize the generation and decomposition thermodynamics, the macroscopic and microscopic kinetics, and the structure of the hydrate.

At present, the generation and decomposition thermodynamics of the hydrate is mainly characterized by a high-pressure in-situ DSC, which can obtain the corresponding thermodynamic changing law while acquiring macro-kinetic data during generation and decomposition of the hydrate, thereby helping us to obtain relevant thermodynamic parameters and initial identification of new phases of the hydrate. However, it has been always a difficult problem to characterize the micro-kinetics of hydrate, and only Raman can realize the in-situ process in the prior art. However, due to the randomness of Raman point scanning and the volume changing of hydrate crystals in the growth process, this test method fails to acquire convincing average statistical results. In this regard, the advantages of using neutron diffraction for micro-kinetic studies on generation and decomposition of the hydrate have been gradually recognized in recent years, and neutron diffraction can obtain convincing average statistical results in identification of new phases, phase quantification of the hydrate, etc. However, due to the lack of research institutions at home and abroad to carry out tests in this area, the relevant test methods have not been fully developed. Although relevant research institutions have developed a hydrate reactor suitable for a neutron test, the patent "HIGH-PRESSURE HYDRATE GENERATION DEVICE APPLICABLE TO NEUTRON DIFFRACTION" (Publication Number: CN109758976B) designs a high-pressure hydrate generation device applicable to neutron diffraction, which adopts a press to drive a piston, realizes pressurization of a hydrate reaction cavity by a pressure transmitting medium, and realizes generation and decomposition of a hydrate together with a temperature loading system so as to carry out a micro-kinetic study on the hydrate. However, the high-pressure hydrate generation device is only applicable to a neutron diffraction test, and it is difficult to embed relevant pressure loading devices into a high-pressure in-situ DSC. Therefore, there is no way to apply the high-pressure hydrate generation device to a high-pressure in-situ DSC test at the same time. In fact, acquiring the changing law of thermodynamic parameters during generation and decomposition of the hydrate by the high-pressure in-situ DSC and correlating the changing law with the micro-kinetic law of generation and decomposition of the hydrate are crucial for elucidating the generation and decomposition mechanism of the gas hydrate and for stimulating the development of hydrate-related fields. Therefore, there is an urgent need to develop a reactor and a method, which can be commonly applicable for high-pressure in-situ DSC and neutron tests of the gas hydrate. With the help of this device, researchers will be able to explore the structural generation and evolution mechanism of the hydrate in a real sense, clarify the changing law of thermodynamics in the process, and finally realize control and design of the reaction process.

SUMMARY

An objective of the present invention is to provide a reactor and method commonly applicable for high-pressure in-situ DSC and neutron tests of a gas hydrate, aiming at solving the difficult problem of not being able to correlate the thermodynamic changing law or the phase evolution law in the reaction process in the current study on the generation and decomposition mechanism of the gas hydrate.

To realize the above objective, the present invention adopts the following technical solutions.

In a first aspect, the present invention provides a reactor commonly applicable for high-pressure in-situ DSC and neutron tests of a gas hydrate, including:

- an adaptation section of high-pressure in-situ DSC test, including:
- a reactor body having a reactor raised neck at the bottom, wherein the upper end of the reactor body is provided with a reactor sealing unit and a reactor heating jacket installed during a neutron test, and the reactor heating jacket is configured to maintain the reactor at a set temperature, so as to carry out a kinetic generation and decomposition experiment of the hydrate;
- a DSC test end cavity sealing unit arranged above the reactor body and provided with a quick connector; and a second gas intake pipe having one end connected to the upper end of the reactor sealing unit and the other end extending through the DSC test end cavity sealing unit, wherein a gas enters the reactor body through the second gas intake pipe, thereby providing a material for generation of the gas hydrate and pressurizing the reactor; a metal thermal insulator is arranged on a pipe between the reactor body and the DSC test end cavity sealing unit; the second gas intake pipe passes through the center of an end face of the metal thermal insulator; a plurality of polyvinyl fluoride thermal insulating sheets are also distributed above the metal thermal insulator; and the second gas intake pipe passes through the centers of the plurality of polyvinyl fluoride thermal insulating sheets; and during the neutron test, a neutron stopper is arranged between the two polyvinyl fluoride thermal insulating sheets;

an adaptation section of neutron test installed above the adaptation section of high-pressure in-situ DSC test by the quick connector during the neutron test and including:

a quick coupling flange configured to play a fixing role in the neutron test; and a first gas intake pipe passing through the center of the quick coupling flange.

In the reactor described above, further, the reactor body on the adaptation section of high-pressure in-situ DSC test is assembled and disassembled by using a snap unloading device of the reactor, wherein the snap unloading device of the reactor mainly includes a slot base, a stainless steel base and an open cavity; the open cavity is formed in the center of the stainless steel base; the bottom of the open cavity is provided with the slot base; the diameter of the open cavity matches the external diameter of the reactor body; the slot base is a concave cuboid, and has a size matching the reactor raised neck; and when the reactor body is assembled and disassembled using the snap unloading device, a torque wrench is used to ensure the service life of the reactor sealing unit.

In the reactor described above, further, the height and the external diameter of the reactor body are adapted to a model of a high-pressure in-situ DSC used; the reactor body is made of a vanadium alloy material; a raised portion of the reactor raised neck is a cuboid; and the reactor sealing unit performs sealing by means of metal sealing, and performs fastening by means of screw tightening.

In the reactor described above, further, the upper end of the reactor body is also provided with a temperature sensor.

In the reactor described above, further, the metal thermal insulator is a short cylinder, and the second gas intake pipe and the metal thermal insulator are fastened by means of welding.

In the reactor described above, further, the polyvinyl fluoride thermal insulating sheet is circular, and the outer wall of the second gas intake pipe and the polyvinyl fluoride thermal insulating sheet are fastened by means of snap locking, thus ensuring that the polyvinyl fluoride thermal insulating sheet is capable of sliding up and down along the second gas intake pipe to be adjusted to a set position.

In the reactor as described above, further, the neutron stopper is a circular thin sheet made of metal, and the outer wall of the second gas intake pipe and the neutron stopper are fastened by means of snap locking, so that the neutron stopper is freely assembled and disassembled.

In the reactor as described above, further, a pressure sensor, a one-way gas valve and the quick connector are sequentially arranged on a pipe above the DSC test end cavity sealing unit.

In the reactor as described above, further, the diameter of the first gas intake pipe is larger than that of the second gas intake pipe; during a high-pressure in-situ DSC test, the DSC test end cavity sealing unit is sealed by means of conical sealing; and the quick coupling flange is provided with a temperature and pressure sensor interface, and the temperature and pressure sensor interface is configured to lead out signal transmission lines of temperature and pressure.

In a second aspect, the present invention provides a method commonly applicable for high-pressure in-situ DSC and neutron tests of a gas hydrate, which is used for the reactor as described above and includes the following steps.

In step 1, for a high-pressure in-situ DSC test, a reactor body is cleaned with deionized water, and purged and dried with compressed air; upon completion, a reaction liquid is added; and subsequently, a torque wrench is adopted to connect and tightly seal a reactor sealing unit and a reactor body by means of a snap unloading device of the reactor.

In step 2, an adaptation section of high-pressure in-situ DSC test is placed in a DSC cavity after the reactor body is sealed to fix a metal thermal insulator and a polyvinyl fluoride thermal insulating sheet instead of a stopper for neutron test to a second gas intake pipe.

In step 3, the DSC cavity is vacuumized to make the whole DSC cavity have a certain degree of vacuum under the action of a DSC test end cavity sealing unit; meanwhile, by means of the second gas intake pipe, a gas sequentially passes through the quick connector and the one-way gas valve and then enters the reactor body to carry out a high-pressure in-situ DSC generation and decomposition experiment of a hydrate, a reactor heating jacket is dismounted, and a signal output line of the temperature sensor is removed.

In step 4, upon completion of the high-pressure in-situ DSC test, the one-way gas valve is closed for pressure maintaining of the reactor; then the whole adaptation section of high-pressure in-situ DSC test is taken out and stored in a liquid nitrogen tank; and subsequently, the liquid nitrogen tank and the whole adaptation section of high-pressure in-situ DSC test are transferred to a neutron test site.

In step 5, for a neutron test, the whole adaptation section of high-pressure in-situ DSC test is connected to an adaptation section of neutron test by a quick connector, and at the same time, a plurality of stoppers for neutron test are arranged on a pipe as required.

In step 6, a reactor heating jacket is installed at the upper end of the reactor body, and the temperature sensor and the pressure sensor are connected to respective signal transmission lines to collect temperature and pressure.

In step 7, the two connected test sections are stably placed, by means of the quick coupling flange and the stopper for neutron test, in a neutron test environment to carry out a neutron test.

Compared with the prior art, the present invention has the following beneficial effects:

(1) the reactor provided can not only carry out a high-pressure and low-temperature in-situ DSC test of the hydrate but also be suitable for a neutron diffraction test of the hydrate;

(2) the reactor can be adapted to an existing high-pressure and low-temperature in-situ DSC device without the need to re-develop a whole set of system, thus greatly reducing the replacement cost of the device; and (3) owing to the sectional design, the flexibility and the applicability of the reactor can be ensured, and researchers can conveniently transport the hydrate in a pressure-maintaining manner; and even at a long distance, with the assistance of a liquid nitrogen tank or a vehicle-mounted refrigerator, it can be ensured that the hydrate may not be decomposed during transportation, which greatly enhances the range of service of the neutron diffraction test.

BRIEF DESCRIPTION OF THE DRAWINGS

For clearer descriptions of the technical solutions in the embodiments of the present invention, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

In FIG. 1: 1—reactor raised neck; 2—reactor body; 3—reactor sealing unit; 4—reactor heating jacket; 5—metal thermal insulator; 6—stopper for neutron test; 7—polyvinyl fluoride thermal insulating sheet; 8—DSC test end cavity sealing unit; 9—one-way gas valve; 10—quick connector; 11—quick coupling flange; 12—first gas intake pipe; 13—temperature and pressure sensor interface; 14—pressure sensor; 15—temperature sensor; 16—second gas intake pipe.

In FIG. 2: 17—slot base; 18—stainless steel base; 19—open cavity.

DETAILED DESCRIPTION OF THE EMBODIMENTS

The following clearly and completely describes the technical solutions in the embodiments of the present invention with reference to the accompanying drawings in the embodiments of the present invention. Apparently, the described embodiments are some but not all of the embodiments of this application. All other embodiments acquired by a person of ordinary skill in the art based on embodiments of this application without creative efforts shall fall within the protection scope of this application.

Embodiments:

It should be noted that, in the description, claims, and accompanying drawings of the present invention, the terms such as "first" and "second" are used for distinguishing similar objects, but are not necessarily used for describing a specific sequence or order. It should be understood that the data used in this way can be interchanged under appropriate circumstances, so that the embodiments of the present invention described herein can be implemented in an order other than the order illustrated or described herein. In addition, the terms "include" and "have" and any variations thereof in embodiments of the present invention are intended to cover the inclusion in a non-exclusive manner. For example, the process, method, system, product, or device that includes a series of steps or units need not to be limited to those steps or units as clearly listed, but may include other steps or units not clearly listed or inherent to the process, method, product, or device.

In the description of the present invention, "a plurality of" means at least two, for example, two or three, unless otherwise clearly and specifically limited. In addition, unless otherwise clearly specified and limited, terms such as "mounted", "connected with", and "connected to" should be understood in a broad sense. For example, a connection may be a fixed connection, a detachable connection, or an integrated connection, may be a mechanical connection or an electrical connection, may be a direct connection or an indirect connection via an intermediate medium, or may be an internal connection between two components. For a person of ordinary skill in the art, specific meanings of the above terms in the present invention may be understood based on specific situations.

Figure 1:
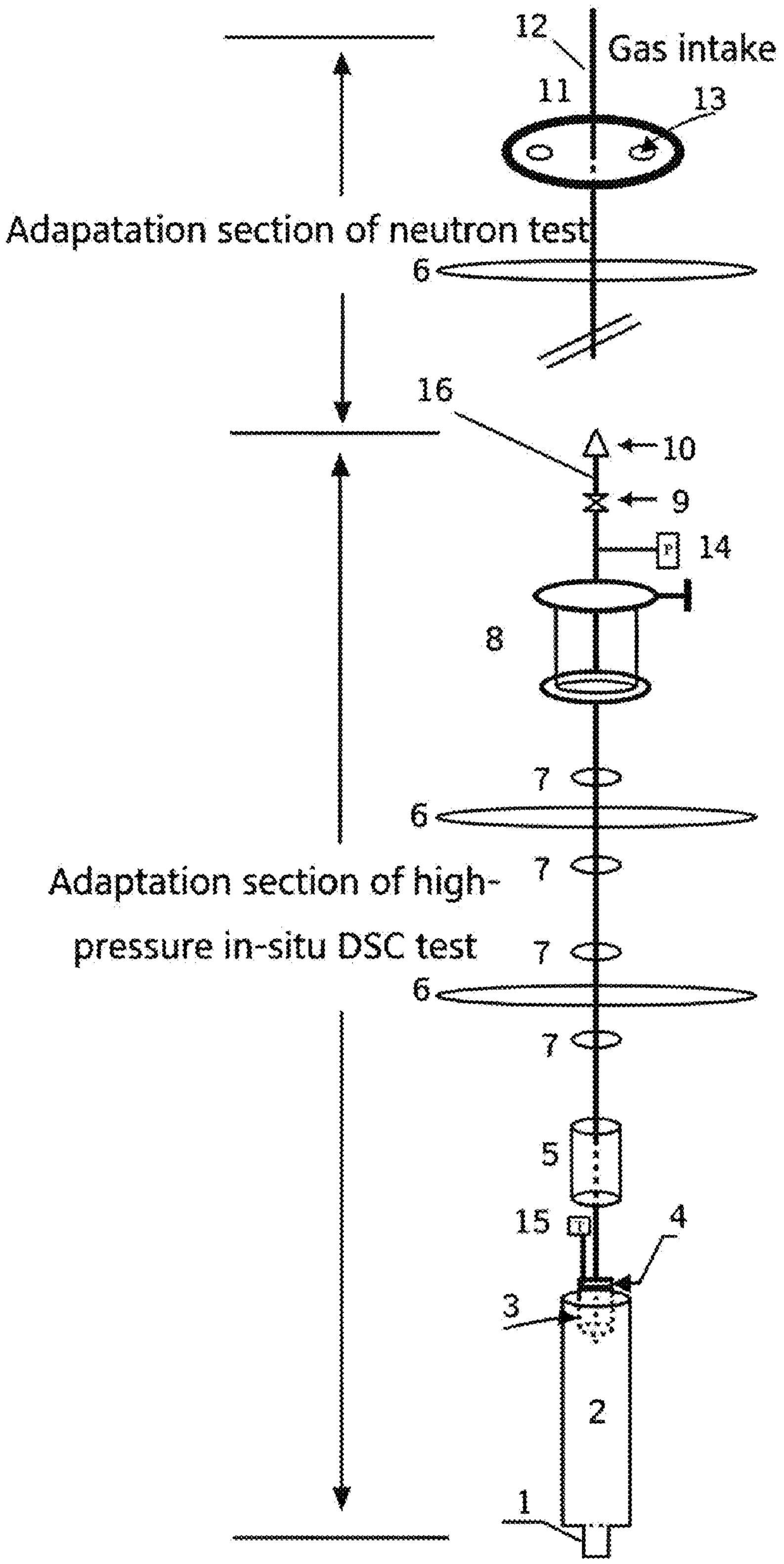
FIG. 1 is a schematic diagram of a reactor according to some embodiments of the present invention.
Figure 2:
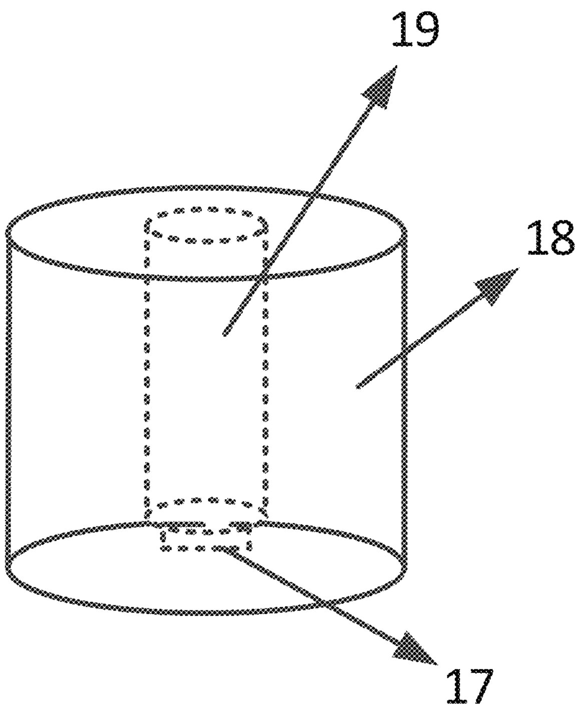
FIG. 2 is a schematic diagram of a snap unloading device according to some embodiments of the present invention.

Referring to FIG. 1 and FIG. 2, a reactor and method commonly applicable for high-pressure in-situ DSC and neutron tests of a gas hydrate are provided. The reactor mainly includes: a reactor raised neck 1, a reactor body 2, a reactor sealing unit 3, a reactor heating jacket 4, a metal thermal insulator 5, a stopper for neutron test 6, a polyvinyl fluoride thermal insulating sheet 7, a DSC test end cavity sealing unit 8, a one-way gas valve 9, a quick connector 10, a quick coupling flange 11, a first gas intake pipe 12, a temperature and pressure sensor interface 13, a pressure sensor 14, a temperature sensor 15, a second gas intake pipe 16, a slot base 17, a stainless steel base 18 and an open cavity 19.

The reactor commonly applicable for high-pressure in-situ DSC and neutron tests of a gas hydrate adopts the idea of a sectional design, and mainly includes two adaptation sections: an adaptation section of neutron test and an adaptation section of high-pressure in-situ DSC test.

The adaptation section of DSC test mainly includes a reactor raised neck 1, a reactor body 2, a reactor sealing unit 3, a reactor heating jacket 4, a metal thermal insulator 5, a polyvinyl fluoride thermal insulating sheet 7, a DSC test end cavity sealing unit 8, a one-way gas valve 9, a quick connector 10, a pressure sensor 14 and a temperature sensor 15.

The height and the external diameter of the reactor body 2 depend on the model of a high-pressure in-situ DSC used, and are required to ensure that the reactor can be successfully placed into a test cavity of the high-pressure in-situ DSC.

The reactor body 2 is made of a vanadium alloy material.

The bottom of the reactor body 2 is provided with the reactor raised neck, with the raised portion being a cuboid.

The upper end of the reactor body 2 is provided with the reactor sealing unit 3, which performs sealing mainly by means of metal sealing and performs fastening by means of screw tightening.

The upper end of the reactor body 2 is also equipped with the reactor heating jacket 4. In one aspect, the heating jacket is designed to ensure that the sealing part of the reactor may not be frozen up, thus facilitating disassembly and assembly of the reactor. In the other aspect, during the neutron test, the reactor can be maintained at a set temperature by controlling the reactor heating jacket 4, so as to carry out a kinetic generation and decomposition experiment of the hydrate.

The reactor heating jacket 4 can be quickly unloaded and installed, and can usually be removed during the DSC test.

The upper end of the reactor body 2 is also equipped with the temperature sensor 15. The temperature sensor 15 needs to be able to withstand the temperature of liquid helium without being damaged, and the accuracy of temperature control needs to meet experimental requirements. In addition, it is necessary to ensure that the entity and a signal transmission line of the temperature sensor 15 can be quickly disassembled, so as to determine whether a temperature signal needs to be output according to the needs of a test environment.

The second gas intake pipe 16 for gas intake is connected to the upper end of the reactor scaling unit 3, and gas enters the reactor body 2 through the second gas intake pipe 16 for gas intake, so as to provide materials for generation of the gas hydrate and to pressurize the reactor.

In order to ensure that the high-pressure in-situ DSC test is not interfered by the outside, one metal thermal insulator 5 is installed at the second gas intake pipe 16 at the upper portion of the reactor body 2. The metal thermal insulator 5 is a short cylinder. The second gas intake pipe 16 passes through the center of the end face of the metal thermal insulator 5. The outer wall of the second gas intake pipe 16 and the metal thermal insulator 5 are fastened by means of welding.

A plurality of circular polyvinyl fluoride thermal insulating sheets 7 are also distributed above the metal thermal insulator 5. The second gas intake pipe 16 passes through the centers of the polyvinyl fluoride thermal insulating sheets 7. The outer wall of the second gas intake pipe 16 and the polyvinyl fluoride thermal insulating sheets 7 are fastened by means of snap locking to ensure that the polyvinyl fluoride thermal insulating sheets 7 can slide up and down along the second gas intake pipe 16 to be adjusted to a proper position, thereby further avoiding damages caused by ultra-low temperature conditions during the neutron test and also facilitating subsequent assembly, disassembly and replacement.

When the neutron test is to be carried out, stoppers for neutron test (or neutron stoppers) are also arranged at different positions of the second gas intake pipe 16 as required. The neutron stoppers are circular thin sheets made of metal. The second gas intake pipe 16 passes through the center of the neutron stopper, and the outer wall of the second gas intake pipe 16 and the neutron stopper are fastened by means of snap locking, so that the neutron stopper can be freely assembled and disassembled, and can be dismounted when the high-pressure in-situ DSC test is to be carried out.

The adaptation section of high-pressure in-situ DSC test has to be inserted into a DSC cavity when the high-pressure in-situ DSC test is to be carried out. In order to prevent interference of the external environment, the DSC test end cavity sealing unit 8 is arranged above the adaptation section of high-pressure in-situ DSC test. The cavity sealing unit is sealed by means of conical scaling.

The pressure sensor 14, the one-way gas valve 9 and the quick connector 10 are sequentially arranged on the second gas intake pipe 16 above the DSC test end cavity scaling unit 8.

The quick connector 10 and the adaptation section of neutron test are connected when the neutron test is to be carried out, and disconnected when the high-pressure in-situ DSC test is to be carried out.

The adaptation section of neutron test mainly includes the quick coupling flange 11, a pipe, and the temperature and pressure sensor interface 13.

The pipe of the adaptation section of neutron test is thicker than the second gas intake pipe 16 of the adaptation section of high-pressure in-situ DSC test, and the selection criteria of the pipe need to be determined according to specific conditions, following the principle of ensuring that the reactor body 2 can be maintained in a fixed position without shaking, rotating and vibrating after the adaptation section of neutron test and the adaptation section of high-pressure in-situ DSC test are connected.

The temperature and pressure sensor interface 13 is reserved on the quick coupling flange 11, and mainly configured to lead out the signal transmission lines of temperature and pressure.

The quick coupling flange 11 is mainly configured to adapt to a neutron test environment and plays a fixing role in the neutron test.

The reactor body 2 on the adaptation section of high-pressure in-situ DSC test is assembled and disassembled by using a snap unloading device of the reactor.

The snap unloading device of the reactor mainly includes the slot base 17, the stainless steel base 18 and the open cavity 19.

The diameter of the open cavity 19 is the same as or slightly larger than the external diameter of the reactor body 2.

The slot base 17 is a concave cuboid, the size of which is the same as or slightly larger than the neck.

A torque wrench is required when the snap unloading device is adopted to disassemble and assemble the reactor body 2, so as to ensure the service life of the reactor sealing unit 3.

Based on the same inventive concept, the present invention also provides a method commonly applicable for high-pressure in-situ DSC and neutron tests of a gas hydrate, which is used in the reactor as described above, and has its specific operation mode mainly including the following steps.

The reactor can carry out not only a high-pressure in-situ DSC test but also a neutron test.

In step 1, for a high-pressure in-situ DSC test, a reactor body 2 is first cleaned with deionized water, and purged and dried with compressed air; upon completion, a reaction liquid is added; and subsequently, a torque wrench is adopted to connect and tightly seal a reactor sealing unit 3 and the reactor body 2 by means of a snap unloading device of the reactor.

In step 2, an adaptation section of high-pressure in-situ DSC test is placed in a DSC cavity after the reactor body 2 is sealed. It should be clear that at this time, instead of a stopper 6 for neutron test, a metal thermal insulator 5 and a polyvinyl fluoride thermal insulating sheet 7 need to be fixed to a second gas intake pipe 16.

In step 3, upon completion, the DSC cavity is vacuumized to make the whole DSC cavity have a certain degree of vacuum under the action of a DSC test end cavity sealing unit 8. Meanwhile, by means of the second gas intake pipe 16, a gas sequentially passed through a quick connector 10 and a one-way gas valve 9 and then entered the reactor body 2 to carry out a high-pressure in-situ DSC generation and decomposition experiment of a hydrate. Generally, a signal output of a reactor heating jacket 4 or of a temperature sensor 15 is not required in the DSC test. Therefore, the reactor heating jacket 4 may be dismounted, and a signal output line of the temperature sensor 15 may be removed.

In step 4, upon completion of the DSC test, the one-way gas valve 9 is closed for pressure maintaining of the reactor; then the whole adaptation section of high-pressure in-situ DSC test is taken out and stored in a liquid nitrogen tank; and subsequently, the liquid nitrogen tank and the whole adaptation section of high-pressure in-situ DSC test are transferred to a neutron test site.

In step 5, the whole adaptation section of high-pressure in-situ DSC test is connected to an adaptation section of neutron test by the quick connector 10, and meanwhile, a plurality of stoppers 6 for neutron test are arranged on the pipe as required.

In step 6, the reactor heating jacket 4 is installed at the upper end of the reactor body 2, and the temperature sensor 15 and the pressure sensor 14 are connected to respective signal transmission lines to collect temperature and pressure.

In step 7, upon completion, the two connected test sections are stably placed, by means of the quick coupling flange 11 and the stopper 6 for neutron test, in a neutron test environment to carry out a neutron test It should be understood that directional or positional relationships indicated by the terms such as “center”, “longitudinal”, “transverse”, “length”, “width”, “thickness”, “upper”, “lower”, “front”, “rear”, “left”, “right”, “vertical”, “horizontal”, “top”, “bottom”, “inner”, “outer”, “clockwise”, “counter-clockwise”, “axial”, “radial”, and “circumferential” are directional or positional relationships as shown in the drawings, are only for the purposes of the case in describing the present invention and simplification of its descriptions, but not for indicating or implying that the specified apparatus or element has to be located in a specific direction, and structured and operated in a specific direction. Therefore, these directional or positional relationships should not be understood as limitations to the present invention.

In the present invention, unless otherwise definitely specified and limited, the first feature being provided “above” or “below” the second feature may mean that the first feature is in direct contact with the second feature, or indirectly in contact with the second feature via an intermediate medium. Moreover, the first feature being provided “over”, “above”, and “on” the second feature may mean that the first feature is provided directly above, or above and staggered from the second feature, or merely means that a level of the first feature is higher than that of the second feature. The first feature being provided “under”, “below”, and “beneath” the second feature may mean that the first feature is provided directly below, or below and staggered from the second feature, or merely means that a level of the first feature is lower than that of the second feature.

In the descriptions of the present description, the descriptions of referring terms such as “one embodiment”, “some embodiments”, “examples”, “specific examples” or “some examples” mean that specific features, structures, materials or characteristics described in combination with the embodiment or example are included in at least one embodiment or example of the present invention. In the present description, the schematic representation of the terms described above does not necessarily refer to the same embodiment or example. Furthermore, the described particular features, structures, materials, or characteristics may be combined in any suitable manner in any one or more embodiments or examples. In addition, different embodiments or examples described in the present description, as well as features of different embodiments or examples, may be integrated and combined so long as they do not conflict with each other.

The above-mentioned embodiments are merely for explaining the technical concept and features of the present invention, and are intended to enable those of ordinary skill in the art to understand the contents of the present invention and to implement them accordingly. Thus, the above embodiments are not intended to limit the scope of protection of the present invention. All equivalent changes or modifications made in accordance with the essence of the present invention should be covered by the scope of protection of the present invention.

The invention claimed is:

1. A reactor commonly applicable for high-pressure in-situ differential scanning calorimetry (DSC) and neutron tests of a gas hydrate, comprising:

an adaptation section of high-pressure in-situ DSC test, comprising:

a reactor body having a reactor raised neck at a bottom, wherein an upper end of the reactor body is provided with a reactor sealing unit and a reactor heating jacket, and the reactor heating jacket is installed during a neutron test and configured to maintain the reactor at a set temperature, so as to carry out a kinetic generation and decomposition experiment of the gas hydrate;

a DSC test end cavity sealing unit arranged above the reactor body and provided with a quick connector; and a second gas intake pipe having a first end connected to an upper end of the reactor sealing unit and a second end extending through the DSC test end cavity sealing unit, wherein a gas enters the reactor body through the second gas intake pipe, thereby providing a material for generation of the gas hydrate and pressurizing the reactor; a metal thermal insulator is arranged on the second gas intake pipe between the reactor body and the DSC test end cavity sealing unit; the second gas intake pipe passes through a center of an end face of the metal thermal insulator; a plurality of polyvinyl fluoride thermal insulating sheets are distributed above the metal thermal insulator; and the second gas intake pipe passes through centers of the plurality of polyvinyl fluoride thermal insulating sheets; and during the neutron test, a neutron stopper is arranged between two polyvinyl fluoride thermal insulating sheets of the plurality of polyvinyl fluoride thermal insulating sheets; and an adaptation section of neutron test, installed above the adaptation section of high-pressure in-situ DSC test by the quick connector during the neutron test and comprising:

a quick coupling flange configured to play a fixing role in the neutron test; and a first gas intake pipe passing through a center of the quick coupling flange.

2. The reactor according to claim 1, wherein the reactor body on the adaptation section of high-pressure in-situ DSC test is assembled and disassembled by using a snap unloading device of the reactor, wherein the snap unloading device of the reactor comprises a slot base, a stainless steel base and an open cavity; the open cavity is formed in a center of the stainless steel base; a bottom of the open cavity is provided with the slot base; a diameter of the open cavity matches an external diameter of the reactor body; the slot base is a concave cuboid, and has a size matching the reactor raised neck; and when the reactor body is assembled and disassembled using the snap unloading device, a torque wrench is used to ensure service life of the reactor sealing unit.

3. The reactor according to claim 1, wherein a height and the external diameter of the reactor body are adapted to a model of a high-pressure in-situ DSC used; the reactor body is made of a vanadium alloy material; a raised portion of the reactor raised neck is a cuboid; and the reactor sealing unit performs sealing by metal sealing and performs fastening by screw tightening.

4. The reactor according to claim 1, wherein the upper end of the reactor body is also equipped with a temperature sensor.

5. The reactor according to claim 1, wherein the metal thermal insulator is a short cylinder, and the second gas intake pipe and the metal thermal insulator are fastened by welding.

6. The reactor according to claim 1, wherein each of the plurality of polyvinyl fluoride thermal insulating sheets is circular, and an outer wall of the second gas intake pipe and each of the plurality of polyvinyl fluoride thermal insulating sheets are fastened by snap locking, wherein each of the plurality of polyvinyl fluoride thermal insulating sheets is configured to slide up and down along the second gas intake pipe to be adjusted to a set position.

7. The reactor according to claim 1, wherein the neutron stopper is a circular thin sheet made of metal, and an outer wall of the second gas intake pipe and the neutron stopper are fastened by snap locking, so that the neutron stopper is freely assembled and disassembled.

8. The reactor according to claim 1, wherein a pressure sensor, a one-way gas valve and the quick connector are sequentially arranged on the second gas intake pipe above the DSC test end cavity sealing unit.

9. The reactor according to claim 1, wherein a diameter of the first gas intake pipe is larger than a diameter of the second gas intake pipe; during a high-pressure in-situ DSC test, the DSC test end cavity sealing unit is sealed by conical sealing; and the quick coupling flange is provided with a temperature and pressure sensor interface, and the temperature and pressure sensor interface is configured to lead out signal transmission lines of temperature and pressure.

10. A method commonly applicable for high-pressure in-situ DSC and neutron tests of a gas hydrate, being used for the reactor according to claim 1 and comprising the following steps:

step 1: for a high-pressure in-situ DSC test, cleaning the reactor body with deionized water, and purging and drying the reactor body with compressed air; upon completion, adding a reaction liquid; and subsequently, adopting a torque wrench to connect and tightly seal the reactor sealing unit and the reactor body by a snap unloading device of the reactor;

step 2: placing the adaptation section of high-pressure in-situ DSC test in a DSC cavity after sealing the reactor body to fix the metal thermal insulator and the plurality of polyvinyl fluoride thermal insulating sheets instead of a stopper for neutron test to the second gas intake pipe;

step 3; vacuumizing the DSC cavity to allow the whole DSC cavity to have a certain degree of vacuum under an action of the DSC test end cavity sealing unit; meanwhile, by the second gas intake pipe, causing a gas to sequentially pass through the quick connector and a one-way gas valve and then to enter the reactor body so as to carry out a high-pressure in-situ DSC generation and decomposition experiment of the gas hydrate; dismounting the reactor heating jacket; and removing a signal output line of a temperature sensor;

step 4: upon completion of the high-pressure in-situ DSC test, closing the one-way gas valve for pressure maintaining of the reactor; then taking out the whole adaptation section of high-pressure in-situ DSC test, and storing the whole adaptation section of high-pressure in-situ DSC test in a liquid nitrogen tank; and subsequently, transferring the liquid nitrogen tank and the whole adaptation section of high-pressure in-situ DSC test to a neutron test site;

step 5: for the neutron test, connecting the whole adaptation section of high-pressure in-situ DSC test to the adaptation section of neutron test by the quick connector, and meanwhile, arranging a plurality of stoppers for neutron test on the first gas intake pipe and the second gas intake pipe as required;

step 6: installing the reactor heating jacket at an upper end of the reactor body, and connecting the temperature sensor and a pressure sensor to respective signal transmission lines to collect temperature and pressure; and step 7: stably placing the adaptation section of high-pressure in-situ DSC test and the adaptation section of neutron test in a neutron test environment by the quick coupling flange and the stopper for neutron test to carry out the neutron test.

11. The method according to claim 10, wherein in the reactor, the reactor body on the adaptation section of high-pressure in-situ DSC test is assembled and disassembled by using the snap unloading device of the reactor, wherein the snap unloading device of the reactor comprises a slot base, a stainless steel base and an open cavity; the open cavity is formed in a center of the stainless steel base; a bottom of the open cavity is provided with the slot base; a diameter of the open cavity matches an external diameter of the reactor body; the slot base is a concave cuboid, and has a size matching the reactor raised neck; and when the reactor body is assembled and disassembled using the snap unloading device, the torque wrench is used to ensure service life of the reactor sealing unit.

12. The method according to claim 10, wherein in the reactor, a height and the external diameter of the reactor body are adapted to a model of a high-pressure in-situ DSC used; the reactor body is made of a vanadium alloy material; a raised portion of the reactor raised neck is a cuboid; and the reactor sealing unit performs sealing by metal sealing and performs fastening by screw tightening.

13. The method according to claim 10, wherein in the reactor, the upper end of the reactor body is also equipped with the temperature sensor.

14. The method according to claim 10, wherein in the reactor, the metal thermal insulator is a short cylinder, and the second gas intake pipe and the metal thermal insulator are fastened by welding.

15. The method according to claim 10, wherein in the reactor, each of the plurality of polyvinyl fluoride thermal insulating sheets is circular, and an outer wall of the second gas intake pipe and each of the plurality of polyvinyl fluoride thermal insulating sheets are fastened by snap locking, wherein each of the plurality of polyvinyl fluoride thermal insulating sheets is configured to slide up and down along the second gas intake pipe to be adjusted to a set position.

16. The method according to claim 10, wherein in the reactor, the neutron stopper is a circular thin sheet made of metal, and an outer wall of the second gas intake pipe and the neutron stopper are fastened by snap locking, so that the neutron stopper is freely assembled and disassembled.

17. The method according to claim 10, wherein in the reactor, a pressure sensor, the one-way gas valve and the quick connector are sequentially arranged on the second gas intake pipe above the DSC test end cavity sealing unit.

18. The method according to claim 10, wherein in the reactor, a diameter of the first gas intake pipe is larger than a diameter of the second gas intake pipe; during the high-pressure in-situ DSC test, the DSC test end cavity sealing unit is sealed by conical sealing; and the quick coupling flange is provided with a temperature and pressure sensor interface, and the temperature and pressure sensor interface is configured to lead out signal transmission lines of temperature and pressure.

* * * * *